(12) United States Patent
Hane

(10) Patent No.: US 8,481,914 B2
(45) Date of Patent: Jul. 9, 2013

(54) OPTICAL ENCODER INCLUDING A PLURALITY OF ENCODER HEADS AND COMMON WIRING LINES

(75) Inventor: Jun Hane, Tokyo (JP)

(73) Assignee: Olympus Corporation, Tokyo (JP)

( * ) Notice: Subject to any disclaimer, the term of this patent is extended or adjusted under 35 U.S.C. 154(b) by 345 days.

(21) Appl. No.: 12/876,532

(22) Filed: Sep. 7, 2010

(65) Prior Publication Data

US 2011/0057092 A1 Mar. 10, 2011

(30) Foreign Application Priority Data

Sep. 8, 2009 (JP) .................................. 2009-207372

(51) Int. Cl.
*G01D 5/34* (2006.01)
(52) U.S. Cl.
USPC ........................ 250/231.13; 356/617; 359/441
(58) Field of Classification Search
USPC ............... 250/231.13–231.18, 237 G, 237 R; 356/616–619; 341/11, 13, 31; 359/436–442, 359/566; 33/1 PT, 1 N
See application file for complete search history.

(56) References Cited

U.S. PATENT DOCUMENTS

| | | | | |
|---|---|---|---|---|
| 3,875,406 | A | * | 4/1975 | Holeman ................. 250/231.13 |
| 5,406,077 | A | * | 4/1995 | Aoki et al. ............... 250/231.18 |
| 2006/0145065 | A1 | * | 7/2006 | Velikotny et al. ........ 250/231.13 |
| 2007/0069925 | A1 | * | 3/2007 | Masaki .......................... 341/50 |

FOREIGN PATENT DOCUMENTS

JP 07-139967 6/1995

* cited by examiner

*Primary Examiner* — Francis M Legasse, Jr.
(74) *Attorney, Agent, or Firm* — Scully, Scott, Murphy & Presser, P.C.

(57) ABSTRACT

An optical encoder is configured as follows. Namely, the optical encoder includes a signal processing circuit which processes encoder signals output from a plurality of encoder heads, a control unit which specifies one of the plurality of encoder heads, sets the signal output of the specified encoder head in an on state, and further sets the outputs of the encoder heads not specified in an off state, thereby causing only the specified encoder head to output an encoder signal to the signal processing circuit, switch signal lines, and a common wiring line which is shared by the plurality of encoder heads and which transmits the encoder signals to the signal processing circuit.

3 Claims, 3 Drawing Sheets

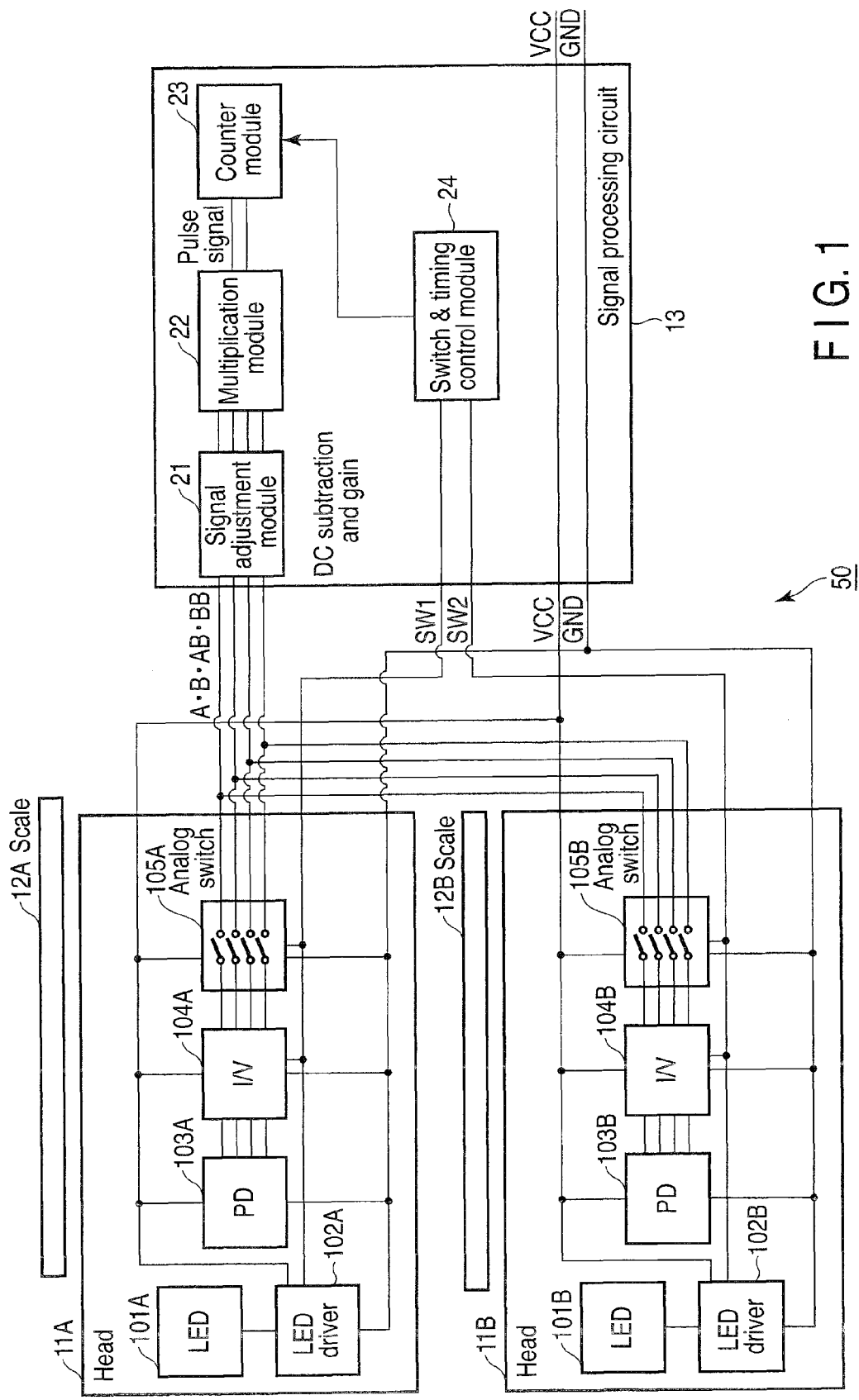
F I G. 1

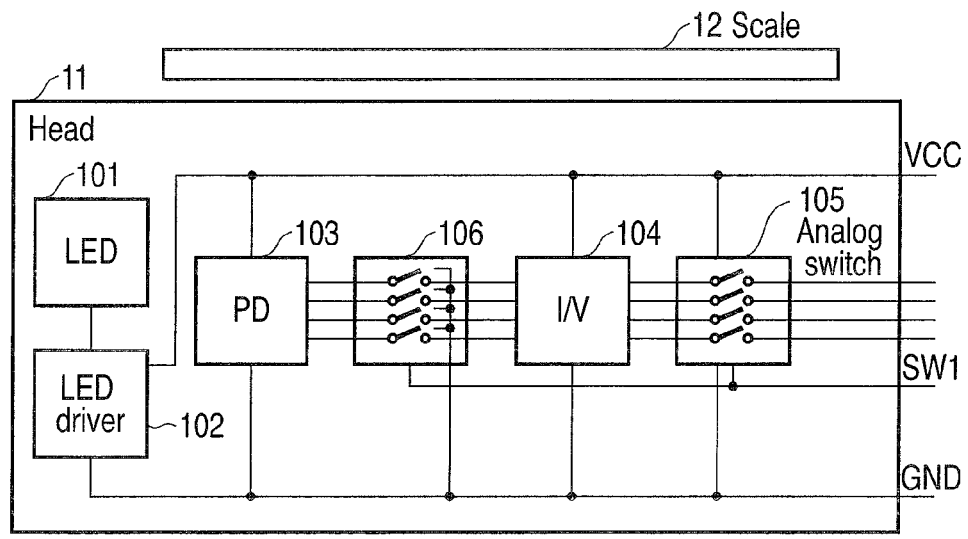
F I G. 2
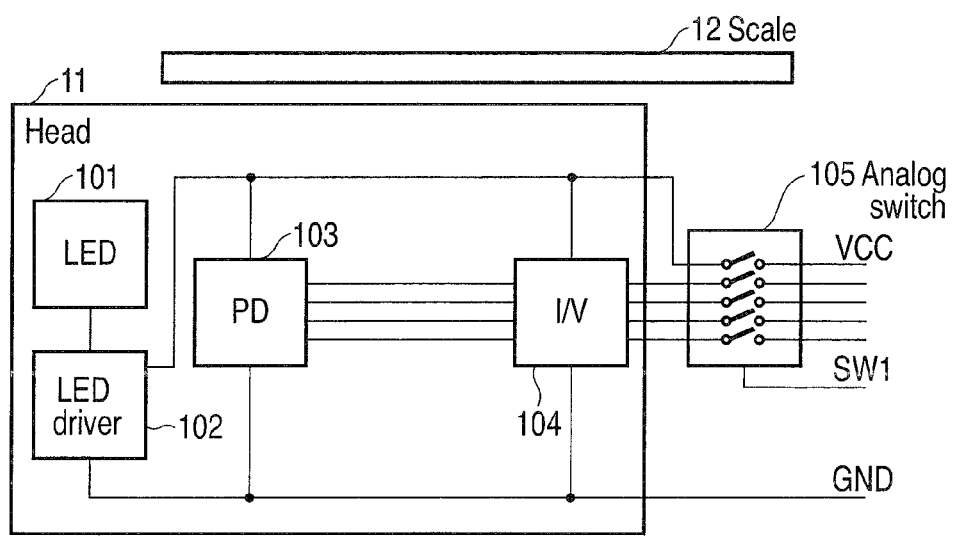
F I G. 3

OPTICAL ENCODER INCLUDING A PLURALITY OF ENCODER HEADS AND COMMON WIRING LINES

CROSS-REFERENCE TO RELATED APPLICATIONS

This application is based upon and claims the benefit of priority from prior Japanese Patent Application No. 2009-207372, filed Sep. 8, 2009, the entire contents of which are incorporated herein by reference.

BACKGROUND OF THE INVENTION

1. Field of the Invention

This invention relates to an optical encoder which detects relative displacement.

2. Description of the Related Art

To control, for example, a manipulator, a robot arm, or the like with high accuracy, it is necessary to incorporate a plurality of encoders acting as position sensors into each of the joints of the manipulator or robot arm. This configuration, however, causes the problem of increasing the size of the apparatus.

Specifically, when as many signal processing circuits for processing encoder signals as are needed are simply provided, a large space for accommodating them must be secured, which exerts an adverse effect on manufacturing cost.

To overcome the problems, for example, Jpn. Pat. Appln. KOKAI Publication No. 7-139967 discloses the signal processing circuit of an incremental encoder where a plurality of position sensors output signals differing in phase. The signal processing circuit is characterized by including input process switching means for taking in output signals from a plurality of position sensors, selecting a signal to be processed from the output signals, and switching to the selected signal.

Specifically, Jpn. Pat. Appln. KOKAI Publication No. 7-139967 discloses a signal processing circuit which processes the output signals from a plurality of encoders that output analog-voltage encoder signals. That is, the output signals from a plurality of encoders acting as position sensors are input to the signal processing circuit. On the basis of a timing instruction created in the signal processing circuit, the signal processing circuit switches signals to be processed and processes the individual encoder signals. Jpn. Pat. Appln. KOKAI Publication No. 7-139967 has also disclosed a signal processing circuit which has a so-called multiplexer function (the function of sample-holding the signals from a plurality of encoders acting as position sensors in the signal processing circuit and processing the signals, switching them).

With the technique disclosed in Jpn. Pat. Appln. KOKAI Publication No. 7-139967, the signals output from a plurality of encoder heads can be processed by a single signal processing circuit.

When a plurality of encoders are incorporated into, for example, a manipulator, a robot arm, or the like, the number of power supplies and the number of signal transmission lines are enormous. Accordingly, a space which accommodates the wiring lines must be very large. Moreover, the stress applied to the lines when the joints are bent must be reduced and an actuator which has a torque surpassing the stress is needed.

When many encoders are particularly provided to cope with the above problems, it is desirable that the power supply lines and signal lines should be combined into common lines to decrease the number of lines and save a space. Furthermore, with the technique disclosed in Jpn. Pat. Appln. KOKAI Publication No. 7-139967, neither a sufficient reduction in the number of lines nor space saving can be realized.

BRIEF SUMMARY OF THE INVENTION

The present invention has been made in consideration of the above situation, and has as its object to provide an optical encoder which processes analog-voltage signals output from a plurality of encoder heads with a single signal processing circuit and realizes a reduction in the number of wiring lines and space saving.

According to an aspect of the present invention, there is provided an optical encoder comprising: a plurality of scales; a plurality of encoder heads which are provided so as to correspond to the plurality of scales respectively and which detect relative displacements from the respective scales; a signal processing circuit which processes encoder signals output from the plurality of encoder heads; a common wiring line which is shared by the plurality of encoder heads and which transmits the encoder signals to the signal processing circuit; a plurality of signal output state switching units which are provided for the plurality of encoder heads in a one-to-one correspondence and which sets at least one signal output from the corresponding one of the encoder heads to the common wiring line in an on state or an off state; and a control unit which specifies one of the plurality of encoder heads, sets the signal output of the specified encoder head in an on state, and further sets the signal outputs of the encoder heads not specified in an off state, thereby controlling the plurality of signal output state switching units so as to cause only the specified encoder head to output the encoder signal to the signal processing circuit.

According to the invention, there is provided an optical encoder which causes a single signal processing circuit to process analog voltage signals output from a plurality of encoders and realizes a reduction in the number of wiring lines and space saving.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing a configuration example of an optical encoder according to a first embodiment of the invention;

FIG. 2 is a view showing a configuration example of an encoder head included in an optical encoder according to a second embodiment of the invention;

FIG. 3 is a view showing a configuration example of an encoder head included in an optical encoder according to a third embodiment of the invention.

DETAILED DESCRIPTION OF THE INVENTION

Figure 4:
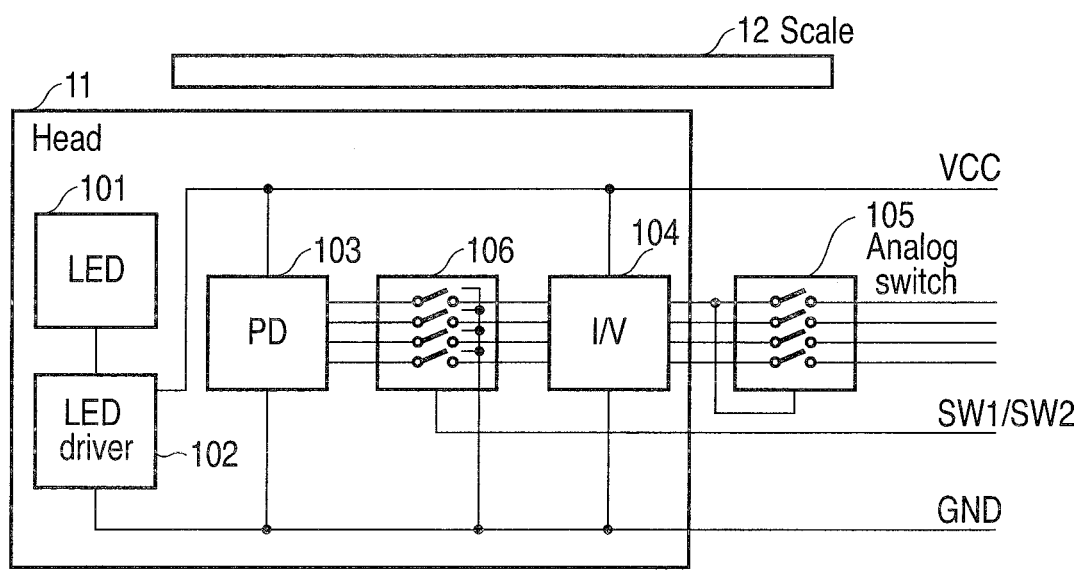
FIG. 4 is a view showing a configuration example of an encoder head included in an optical encoder according to a fourth embodiment of the invention.

Hereinafter, referring to the accompanying drawings, embodiments of the inventions will be explained.

[First Embodiment]

FIG. 1 is a view showing an example of the configuration of an optical encoder according to a first embodiment of the invention. As shown in FIG. 1, an optical encoder 50 comprises an encoder head 11A, a scale 12A, an encoder head 11B, a scale 12B, and a signal processing circuit 13.

Encoder head 11A includes a light-emitting diode (LED) acting as a light source 101A, an LED driver 102A for driving LED 101A, a photodiode (PD) 103A which receives light emitted from LED 101A and reflected by scale 12A, a current-to-voltage (I/V) conversion module 104A which subjects current output from PD 103A to I/V conversion, thereby performing gain processing, and an analog switch 105A which performs on/off control of the output from I/V conversion module 104A.

Scale 12A is arranged so as to face encoder head 11A. Scale 12A and encoder head 11A are members for detecting the displacement of a first movable axis.

Encoder head 11B includes an LED 101B serving as a light source, an LED driver 102B for driving LED 101B, a PD 103B which receives light emitted from LED 101B and reflected by scale 12B, an I/V conversion module 104B which subjects current output from PD 103B to I/V conversion, thereby performing gain processing, an analog switch 105B which performs on/off control of the output of I/V conversion module 104B.

Scale 12B is arranged so as to face encoder head 11B. Scale 12B and encoder head 11B are members for detecting the displacement of a second movable axis.

The signal processing circuit 13 includes a signal adjustment module 21 to which the output signals from encoder heads 11A and 11B are input and which makes adjustments by obtaining a differential signal between the output signals, a multiplication module 22 which carries out a multiplication process on the basis of a high-resolution digitization process, and a control module 24 for calculating a position for each encoder. The signal processing circuit 13 operates on a fixed voltage (VCC-GND) applied by a power supply (not shown) and processes the signals output from encoders 11A and 11B. The signal processing circuit 13 also supplies electric power to encoder heads 11A and 11B via encoder head power supply lines.

Switch signal lines SW1 and SW2 are connected to encoder heads 11A and 11B, respectively. Switch signal lines SW1 and SW2 are then connected to the control module 24. The control module 24 controls the operations of encoder heads 11A and 11B via switch signal lines SW1 and SW2.

In the configuration of the signal processing circuit 13, the control module 24 is an essential structural requirement and the remaining structural requirements are not essential. That is, the signal processing circuit 13 has only to be configured to be capable of processing the encoder signals output from encoder heads 11A and 11B and is not limited to the configuration of FIG. 1 at all. That is, the signal adjustment module 21, multiplication module 22, and counter module 23 may be replaced or modified with various members. For example, the signal adjustment module 21 may not be provided. In addition, a binarizing circuit may be provided in place of the multiplication module 22. The process performed by the counter 23 may be carried out by a subsequent processing module.

Hereinafter, the connections of wiring lines between encoder heads 11A and 11B and signal processing circuit 13 will be explained.

First, the output signal lines from encoder heads 11A and 11B are connected to common signal lines near encoder heads 11A and 11B. Then, the common signal liens are connected to the signal input part of the signal processing circuit 13.

The number of input terminals of the signal input part of the signal processing circuit 13 corresponds to one encoder head. Similarly, the number of power supply lines (power supply VCC line and GND line) of the input part of the signal processing circuit 13 corresponds to one encoder head. Then, the common power supply lines are caused to branch off near encoder heads 11A and 11B.

Switch signal lines, SW1 and SW2, are provided as many as encoder heads, 11A and 11B. When the number of encoder heads is particularly large, encode lines, instead of decode lines, may be used directly as the switch signal lines, thereby decreasing the number of wiring lines.

For example, when an address is specified in binary numbers, the number of wiring lines can be reduced to a value of the order of about (log N/log 2) for the number of encoders N. In addition, analog voltage lines which set outputs in the on state at a specific voltage may be used. Moreover, if output on/off is specified by transmitting a command in serial communication, the number of switch signal lines can be reduced to about one or two lines.

Hereinafter, signal processing performed by the optical encoder 50 will be explained.

Each of PD 103A and PD 103B outputs four phase signals spaced at 90° phase intervals. The signals output from PDs 103A and 103B are processed by I/V conversion modules 104A and 104B, respectively, and the resulting signals are output to the signal processing circuit 13.

The signal outputs from I/V conversion module 104A via analog switch 105A are periodic detection signals corresponding to the relative displacement of encoder head 11A from scale 12A. Similarly, the signal outputs from I/V conversion module 104B via analog switch 105B are periodic detection signals corresponding to the relative displacement of encoder head 11B from scale 12B.

While in the first embodiment, the four phase signals spaced at 90° phase intervals have been used, signals with other phase differences or a different number of phases may be used.

As described above, the signals from switch signal lines SW1 and SW2 are input to encoders 11A and 11B, respectively, via the input terminals (not shown). The operations of encoders 11A and 11B are controlled by the input signals.

In encoder head 11A, when switch signal line SW1 is on, LED driver 102A and I/V conversion module 104A carry out the aforementioned specific processes and analog switch 105A brings the output lines of encoder head 11A into a CLOSED state. As a result, LED 101A lights, I/V conversion module 104A subjects the current output from PD 103A to I/V conversion, and the output from I/V conversion module 104A is output to outside encoder head 11A.

When switch signal line SW1 is off, LED driver 102A reduces current flowing in LED 101A to zero, preventing electric power from being supplied to I/V conversion module 104A, which stops the operation of I/V conversion module 104A. At the same time, analog switch 105A brings the output lines of encoder head 11A into an OPEN state, preventing I/V conversion module 104A from supplying the output externally of encoder head 11A.

In encoder head 11B, when switch signal line SW2 is on, LED driver 102B and I/V conversion module 104B carry out the aforementioned specific processes and analog switch 105B brings the output lines of encoder head 11B into the CLOSED state. As a result, LED 101B lights, I/V conversion module 104B subjects the current output from PD 103B to I/V conversion, and the output from I/V conversion module 104B is output externally of encoder head 11B.

When switch signal line SW2 is off, LED driver 102B reduces current flowing in LED 101B to zero, preventing electric power from being supplied to I/V conversion module 104B, which stops the operation of I/V conversion module 104B. At the same time, analog switch 105B brings the output lines of encoder head 11B into the OPEN state, preventing I/V conversion module 104B from supplying the output externally of encoder head 11B.

In the processes performed by I/V conversion modules 104A and 104B of encoder heads 11A and 11B, respectively, and the process performed by the signal adjustment module 21 of the signal processing circuit 13, for example, a signal correction process, such as a gain correction or offset correction process, may be carried out suitably.

Hereinafter, operation control performed by the control module 24 of the signal processing circuit 13 will be explained in detail.

The control module 24 of the signal processing circuit 13 turns on and off switch signal line SW1 and switch signal line SW2 alternately, which causes encoder head 11A and encoder head 11B to operate alternately. That is, encoder head 11A and encoder head 11B output an encoder signal alternately.

Specifically, when switch signal line SW1 is on, LED 101A of target encoder head 11A goes on, causing encoder signals to be generated by the aforementioned process of encoder head 11A. The encoder signals are output via analog switch 105A to the signal processing circuit 13.

Similarly, when switch signal line SW2 is on, LED 101B of target encoder head 11B goes on, causing encoder signals to be generated by the aforementioned process of encoder head 11B. The encoder signals are output via analog switch 105B to the signal processing circuit 13.

When switch signal line SW1 is off, the driving signal of LED 101A of target encoder head 11A becomes zero, making LED 101A go out, which prevents encoder signals from being generated. I/V conversion module 104A stops operation and analog switch 105A brings the output lines to the signal processing circuit 13 into the OPEN state.

Similarly, when switch signal line SW2 is off, the driving signal of LED 101B of target encoder head 11B becomes zero, making LED 101A go out, which prevents encoder signals from being generated. I/V conversion module 104B stops operation and analog switch 105B brings the output lines to the signal processing circuit 13 into the OPEN state.

To bring the output lines of the encoder signals into the OPEN state, analog switches 105A and 105B have only to be turned off. That is, the configuration and processes for stopping the driving currents of LED 101A and LED 101B or stopping the operations of I/V conversion modules 104A and 104B are not essential structural requirements.

To stop the operation of encoder head 11A, the power supply to LED driver 102A may be stopped by, for example, using a configuration that stops the power supply of LED driver 102A instead of reducing the driving current of LED 101A to zero.

Similarly, to stop the operation of encoder head 11B, the power supply to LED driver 102B may be stopped by, for example, using a configuration that stops the power supply of LED driver 102B instead of reducing the driving current of LED 101B to zero.

The signal processing circuit 13 carries out the process of detecting a position with encoder head 11A and scale 12A and the process of detecting a position with encoder head 11B and scale 12B. That is, the signal processing circuit 13 processes the encoder signals output from a plurality of encoder heads.

Specifically, the signal adjustment module 21 makes adjustments by obtaining differential signals from the input encoder signals. Then, the multiplication module 22 carries out a multiplication process on the basis of a high-resolution digitization process. Then, the counter module 23 calculates a position from the multiplication result. Since the processes performed by the signal adjustment module 21, multiplication module 22, and counter module 23 are the same as those performed by a conventional optical encoder, a detailed explanation of them will be omitted.

In the optical encoder of the first embodiment, the position detection process is carried out for each encoder head specified by the control module 24. That is, the position detection process performed by each of the encoder heads is interrupted in the period of time when the encoder head is off (or the period of time when position detection has not been specified). At this time, the encoder head holds the position information detected last.

Furthermore, the position corresponding to each of the encoder heads is detected at intervals of processing time sufficiently shorter compared with the displacement speed of the encoder head. This enables a position to be detected without problems even if there is an interruption time in the process of detecting a position.

While in the first embodiment, the positions corresponding to the two encoder heads 11A and 11B have been detected, three or more encoder heads may be provided. In that case, wiring lines related to the power supply, signals, and switches are increased in number suitably. In a configuration where three or more encoder heads are provided, the control module 24 specifies one encoder head at a time when specifying an encoder head that outputs signals. That is, the control module 24 specifies one of a plurality of encoder heads, sets the signal outputs of the specified encoder head in the on state, and further sets the signal outputs of the encoder heads not specified in the off state. By doing this, only the specified encoder head is caused to output encoder signals to the signal processing circuit, thereby making it possible to detect a position corresponding to each of the encoders in the same manner as in the aforementioned processes.

As described above, according to the first embodiment, there is provided an optical encoder which processes the analog voltage signals output from a plurality of encoder heads with a single signal processing circuit and realizes a reduction in the number of wiring lines and space saving.

Specifically, with the optical encoder of the first embodiment, switch signal lines SW1 and SW2, the terminals related to switch terminals SW1 and SW2, and analog switches 105A and 105B are additionally provided to carry out the aforementioned processes, which enables the positions corresponding to a plurality of encoder heads to be detected with a single signal processing circuit without problems and realizes a reduction in the number of wiring lines and space saving by combining the power supply lines and signal lines into common power supply lines and common signal lines.

Furthermore, the supply of electric power to the encoder heads is stopped during the interruption time, thereby achieving power saving.

Hereinafter, the effects of the optical encoder of the first embodiment are enumerated concretely:

Analog switches are used to switch on or off the outputs of the encoder signals, which enables the output signals from a plurality of encoder heads to be processed with a single signal processing circuit.

The output lines of the encoder signals are combined into common lines, thereby decreasing the number of wiring lines.

Only one signal processing circuit is used and the number of wiring lines is reduced, thereby making smaller the size of the apparatus/system into which the optical encoders are incorporated and decreasing the cross-sectional area where wiring lines are run.

Making smaller and thinner the apparatus/system into which the optical encoders are incorporated enables force and torque necessary to move the moving parts to be reduced. This makes it possible to cause the optical encoders to function properly even if the rigidity of the overall apparatus/system into which the optical encoders are incorporated is low.

The installation space needed for the optical encoders is reduced and therefore the positions of more moving axes can be detected. Accordingly, the positions can be detected and controlled with much higher accuracy.

An analog switch acting as a signal output state switching module for switching signal output states is provided for each of the encoder heads, which makes it possible to switch signal output states for each of the encoder heads individually.

The signal outputs from a plurality of encoder heads are connected to combine the outputs into the common lines and switches are configured to turn on only the output of an encoder head from which at least one signal is to be obtained, which enables the number of wiring lines to be decreased.

Providing an individual setting terminal for switching signal output states for each of the encoder heads makes it possible to switch signal output states easily for each of the encoder heads.

When the switch signal line SW is off, the output lines of the encoder signals from the corresponding encoder head is brought into the OPEN state. By doing this, the encoder output signals from the encoder head can be connected directly to common encoder signal lines.

Neither a special method nor a special jig is needed to connect the encoder heads to the common encoder signal lines. The encoder heads have only to be connected directly to the common encoder signal lines, which realizes space saving.

The LED of an encoder head is turned on or off in conjunction with the turning on or off of the output of the encoder signals, thereby the LED is turned off when the encoder signals are not output. Similarly, the I/V conversion of the I/V conversion module is stopped in conjunction with the turning on or off of the output of the encoder signals, thereby the consumption of the LED driving current and the consumption current at the I/V conversion module can be suppressed at the same time.

Power saving is realized by turning on or off a specific wiring line in the encoder head or by stopping the operation partially by switching connections.

[Second Embodiment]

Hereinafter, an optical encoder according to a second embodiment of the invention will be explained. To avoid the repetition of the same explanation, what differs from the optical encoder of the first embodiment will be explained. The optical encoder of the second embodiment differs from that of the first embodiment in the configuration of the encoder head.

The configuration of the encoder head 11 unique to the optical encoder of the second embodiment may be applied to, for example, both of encoder heads 11A and 11B included in the optical encoder of the first embodiment or either encoder head 11A or 11B. That is, the configuration may be applied to at least one of the encoder heads.

FIG. 2 is a view showing a configuration example of the configuration of an encoder head included in the optical encoder of the second embodiment. As shown in FIG. 2, the encoder head 11 comprises an LED 101 acting as a light source, an LED driver 102 for driving the LED 101, a PD 103 which receives light emitted from the LED 101 and reflected by the scale 12, an I/V conversion module 104 which subjects current output from the PD 103 to I/V conversion, thereby performing gain processing, an analog switch 105 which performs on/off control of the output of the I/V conversion module 104, and an analog switch 106 connected between the PD 103 and I/V conversion module 104.

Analog switch 106 is a structural requirement unique to the optical encoder of the second embodiment. A signal transmitted through the switch signal line SW is input only to analog switches 105 and 106.

Hereinafter, a process unique to the optical encoder of the second embodiment will be explained.

A signal on the switch signal line SW is input to the encoder head 11 via an input terminal (not shown). When the switch signal line SW is on, the LED 101, LED driver 102, PD 103, and I/V conversion module 104 function as described above and analog switch 105 brings the output of the encoder head 11 into the CLOSE state.

As a result, the LED 101 is switched on and the I/V conversion module 104 subjects the current output from the PD 103 to I/V conversion. At the same time, the output of the I/V conversion module 104 is output externally of the encoder head 11.

When the switch signal line SW is off, analog switch 106 causes all of the current output from the PD 103 to flow to the GND side and analog switch 105 brings the output lines of the encoder head 11 into the OPEN state, preventing the I/V conversion module 104 from supplying the output externally of the encoder head 11.

As described above, according to the second embodiment, there is provided an optical encoder which produces not only the same effect as that of the first embodiment but also the following effects.

When the switch signal line SW is off, current generated by the PD 103 can be discharged externally by causing the current from the PD 103 to flow to the GND. In this case, even if the LED 101 is on or if external light enters the PD 103, current generated by the PD 103 is discharged externally, which enables position detection with high accuracy.

That is, even when the LED 101 lights continuously or when external light enters the PD 103, a position can be detected with high accuracy. Accordingly, the LED 101 is continuously on, which enables LED light to be emitted stably and a position to be detected with high accuracy. As a result, the output signals from the encoder head can be read in a short time and the accuracy of position detection is increased.

[Third Embodiment]

Hereinafter, an optical encoder according to a third embodiment of the invention will be explained. To avoid the repetition of the same explanation, what differs from the optical encoder of the first embodiment will be explained. The optical encoder of the third embodiment differs from that of the first embodiment in the configuration of the encoder head.

The configuration of the encoder head 11 unique to the optical encoder of the third embodiment may be applied to, for example, both encoder heads 11A and 11B included in the optical encoder of the first embodiment or either encoder head 11A or 11B. That is, the configuration may be applied to at least one of the encoder heads.

FIG. 3 is a view showing a configuration example of the configuration of an encoder head included in the optical encoder of the third embodiment. As shown in FIG. 3, the encoder head 11 comprises an LED 101 acting as a light source, an LED driver 102 for driving the LED 101, a PD 103 which receives light emitted from the LED 101 and reflected by the scale 12, an I/V conversion module 104 which subjects current output from the PD 103 to I/V conversion, thereby performing gain processing, and an analog switch 105 which performs on/off control of the output of the I/V conversion module 104.

The encoder head of the optical encoder of the third embodiment differs from that of the first embodiment in the way analog switch 105 is arranged. Specifically, as shown in FIG. 3, analog switch 105, which is arranged outside the encoder head 11, is configured to switch on or off the output of encoder signals and further switch on or off the application of supply voltage VCC.

With this configuration, an existing encoder head can be used. That is, analog switch 105 is provided on the outside of an existing encoder head, thereby configuring an optical encoder of the third embodiment.

With the optical encoder of the third embodiment, analog switch 105 operates outside the encoder head 11. When the switch signal line is off, the supply voltage to the encoder head 11 goes off and the encoder head 11 stops operating. Except for this point, the optical encoder of the third embodiment operates in the same manner as that of the first embodiment.

As described above, according to the third embodiment, there is provided an optical encoder which produces not only the same effect as that of the first embodiment but also the following effects.

Providing analog switch 105 outside the encoder head 11 enables an existing encoder head to be combined with analog switch 105, thereby realizing a reduction in the number of wiring lines and space saving.

Furthermore, when the switch signal line SW is off, the power supply of the encoder head 11 goes off, achieving considerable electric power saving.

[Fourth Embodiment]

Hereinafter, an optical encoder according to a fourth embodiment of the invention will be explained. To avoid the repetition of the same explanation, what differs from the optical encoder of the first embodiment will be explained. The optical encoder of the fourth embodiment differs from that of the first embodiment in the configuration of the encoder head.

The configuration of the encoder head 11 unique to the optical encoder of the fourth embodiment may be applied to, for example, both encoder heads 11A and 11B included in the optical encoder of the first embodiment or either encoder head 11A or 11B. That is, the configuration may be applied to at least one of the encoder heads.

FIG. 4 is a view showing a configuration example of the configuration of an encoder head included in the optical encoder of the fourth embodiment. As shown in FIG. 4, the encoder head 11 comprises an LED 101 acting as a light source, an LED driver 102 for driving the LED 101, a PD 103 which receives light emitted from the LED 101 and reflected by the scale 12, an I/V conversion module 104 which subjects current output from the PD 103 to I/V conversion, thereby performing gain processing, an analog switch 105 which performs on/off control of the output of the I/V conversion module 104, and an analog switch 106 connected between the PD 103 and I/V conversion module 104.

In the optical encoder of the fourth embodiment, analog switch 105 is arranged outside the encoder head 11 and analog switch 106 is connected between the PD 103 and I/V conversion module 104. One signal output from the encoder head 11 is input to analog switch 105.

The function of analog switch 106 is the same as that of analog switch 106 of the second embodiment.

The functions unique to the fourth embodiment are as follows.

The output voltage from analog switch 106 when the switch signal line SW is off causes analog switch 105 to switch the signal output lines from the encoder head 11 to the OPEN state. In the fourth embodiment, when the output voltage of analog switch 106 when the switch signal line SW is off is at the power supply voltage VCC or GND.

Analog switch 105, which functions outside the encoder head 11, operates without using the signal from the switch signal line.

As described above, according to the fourth embodiment, there is provided an optical encoder which produces not only the same effect as that of the first embodiment but also the following effects.

Analog switch 105 is arranged outside the encoder head 11. From the output voltage of the encoder head 11, it is possible to check the processing state of the encoder head 11, that is, the on/off switching state of analog switch 106.

Furthermore, analog switch 105 is operated by the output voltage of the encoder head 11 when analog switch 106 is off, eliminating the need to input the signal of the switch signal line SW to analog switch 105. Therefore, there is no need to ramify the switch signal line SW near the encoder head 11, which increases the degree of freedom of wiring lines.

While the first to fourth embodiments have been explained, the invention is not limited to those embodiments and may be practiced or embodied in still other ways without departing from the spirit or essential character thereof.

For instance, each of the embodiments may be applied to a magnetic encoder, a displacement sensor, or the like instead of an optical encoder. Specifically, the configuration, functions, and effects may be applied to other magnetic encoders, displacement sensors, or the like, except for the light-emitting module and light-receiving module.

Furthermore, the above embodiments include inventions of different stages and therefore various inventions can be extracted by combining suitably a plurality of structural requirements disclosed in the embodiments. For example, even if some are removed from all of the structural requirements shown in the embodiments, the resulting configuration can be extracted as an invention, provided that the subject to be achieved by the invention is accomplished and the effect of the invention is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical encoder comprising:
   scales;
   encoder heads which are provided so as to correspond to the scales respectively and which detect relative displacements from the respective scales;

a signal processing circuit which processes encoder signals output from the encoder heads;

at least one common wiring line which is shared by the encoder heads and which transmits the encoder signals to the signal processing circuit;

signal output state switching units which are provided for the encoder heads in a one-to-one correspondence and each of which sets at least one signal output from the corresponding encoder head to the common wiring line in an on state or an off state; and a control unit which specifies one of the encoder heads, sets the signal output of the specified encoder head in an on state, and further sets the signal outputs of the encoder heads not specified in an off state, thereby controlling the signal output state switching units so as to cause only the specified encoder head to output the encoder signal to the signal processing circuit, wherein the encoder heads set in the off state by the corresponding signal output state switching units output a specific voltage value as the encoder signals to the common wiring line.

2. An optical encoder comprising:

scales;

encoder heads which are provided so as to correspond to the scales respectively and which detect relative displacements from the respective scales;

a signal processing circuit which processes encoder signals output from the encoder heads;

at least one common wiring line which is shared by the encoder heads and which transmits the encoder signals to the signal processing circuit;

signal output state switching units which are provided for the encoder heads in a one-to-one correspondence and each of which sets at least one signal output from the corresponding encoder head to the common wiring line in an on state or an off state; and a control unit which specifies one of the encoder heads, sets the signal output of the specified encoder head in an on state, and further sets the signal outputs of the encoder heads not specified in an off state, thereby controlling the signal output state switching units so as to cause only the specified encoder head to output the encoder signal to the signal processing circuit, wherein the control unit switches the state of at least one specific wiring line provided in each of the encoder heads between the on and off states or switches where to connect the wiring line at the same time that the signal output state switching units switch the state of the signals output from the encoder heads to the common wiring line between the on and off state, and the signal output state switching unit switches between the on state and off state of the specific wiring line, thereby switching between the on state and off state of a current-voltage conversion output line in a signal generating unit included in the encoder head.

3. An optical encoder comprising:

scales;

encoder heads which are provided so as to correspond to the scales respectively and which detect relative displacements from the respective scales;

a signal processing circuit which processes encoder signals output from the encoder heads;

at least one common wiring line which is shared by the encoder heads and which transmits the encoder signals to the signal processing circuit;

signal output state switching units arranged in the encoder heads which are provided for the encoder heads in a one-to-one correspondence and each of which sets at least one signal output from the corresponding encoder head to the common wiring line in an on state or an off state; and a control unit which specifies one of the encoder heads, sets the signal output of the specified encoder head in an on state, and further sets the signal outputs of the encoder heads not specified in an off state, thereby controlling the signal output state switching units so as to cause only the specified encoder head to output the encoder signal to the signal processing circuit, wherein the control unit switches the state of at least one specific wiring line provided in each of the encoder heads between the on state and off state or switches where to connect the wiring line at the same time that the signal output state switching units switch the state of the signals output from the encoder heads to the common wiring line between the on state and off state, and the signal output state switching unit switches between the on state and off state of the specific wiring line, thereby switching between the on state and off state of a current-voltage conversion output line in a signal generating unit included in the encoder head.

* * * * *